United States Patent

Jukl et al.

[11] Patent Number: 5,926,460
[45] Date of Patent: Jul. 20, 1999

[54] TRANSMISSION MONITORING SYSTEM AND METHOD

[75] Inventors: Milan F. Jukl, Neshanic Station; William J. Leighton, III, Scotch Plains; Joseph Peter Savicki, Clinton, all of N.J.

[73] Assignee: Lucent Technologies Inc., Murray Hill, N.J.

[21] Appl. No.: 08/395,137

[22] Filed: Feb. 27, 1995

[51] Int. Cl.⁶ ........................................................ H04J 1/16
[52] U.S. Cl. ........................................................... 370/241
[58] Field of Search ............................... 370/13, 13.1, 14, 370/15, 17, 85.1, 110.1, 110.2, 110.3, 110.4, 7, 8, 9, 10, 241, 242, 245, 247, 248, 249, 250, 251, 204–208, 524, 522, 526, 525; 375/213, 224, 225, 227, 228, 357, 358, 258; 455/4.1, 6.1, 8, 9, 17, 38.5, 67.1, 67.2, 67.4, 67.7, 68; 374/1, 2, 5, 6, 7, 10, 11, 22, 23, 24, 25, 20, 27, 28, 29, 93, 94, 95, 96, 97, 98, 106, 107, 109, 112; 380/18, 19, 10; 324/512, 528, 533, 96, 97; 371/3, 20.1, 20.2, 20.3, 20.4, 20.5, 20.6, 22.1, 24.1, 25.1, 34, 35; 345/182.06, 183.01; 340/825.48, 539, 506, 531, 825.4, 505, 533, 536, 825.54, 870.02; 348/6, 14, 10, 18, 181, 184

[56] References Cited

U.S. PATENT DOCUMENTS

| 4,733,223 | 3/1988 | Gilbert | 379/49 |
|---|---|---|---|
| 4,939,765 | 7/1990 | Benjamin et al. | 379/29 |
| 5,208,803 | 5/1993 | Conforti et al. | 370/13 |
| 5,457,729 | 10/1995 | Hamann et al. | 370/13 |

*Primary Examiner*—Dang Ton
*Attorney, Agent, or Firm*—Patricia A. Verlangieri

[57] ABSTRACT

A system and method that overcomes the deficiencies of prior television/multimedia system integrity monitoring schemes by providing a system and method wherein a remote field component receives a test signal from a given source via a particular signal path, and, in response, provides feedback indicative of the received test signal to the source via a standard voiceband telephone connection. This enables the invention to facilitate simple, economical real-time testing/monitoring of television/multimedia distribution systems. The invention is particularly suited to television/multimedia systems that employ terrestrial cables as a means to distribute signals to end-users or remote nodes, but can also be applied to wireless signal distribution systems.

37 Claims, 2 Drawing Sheets

TRANSMISSION MONITORING SYSTEM AND METHOD

TECHNICAL FIELD

The invention relates to the monitoring of transmission systems and, more particularly, to a system and method facilitating such monitoring in a multimedia and/or video environment.

BACKGROUND OF THE INVENTION

In video and/or multimedia terrestrial transmission systems, such as cable television systems ("CATV"), it is desirable to evaluate the integrity of the transmission lines that carry signals between distribution offices and end users/subscribers. Such integrity evaluations may be performed on a periodic basis to gauge the overall reliability of the transmission system, or can be targeted to specific lines in response to a particular service problem. Naturally, to minimize inconvenience to users of the transmission system it would be advantageous to perform such evaluations in a manner that does not disrupt the transmission and reception of signals normally carried via the lines being evaluated.

Presently, CATV providers locate line integrity problems by investigating customer complaints. That is, in response to receiving one or more complaints from subscribers that service is less than optimal, a locus for the likely problem is found, and service personnel dispatched to check the line or lines in question. In typical cable video/multimedia distribution systems there exists no ready means for performing a test of a particular connection between a central distribution office and one or more remote nodes or subscriber premises, and certainly no means to provide real-time feedback showing the result of such a test.

SUMMARY OF THE INVENTION

The present invention overcomes the deficiencies of prior television/multimedia system integrity monitoring schemes by providing a system and method wherein a remote field component receives a test signal from a given source via a particular signal path, and, in response, provides feedback indicative of the received test signal to the source via a standard voiceband telephone connection. The invention thus facilitates simple, economical real-time testing/monitoring of television/multimedia distribution systems. The invention is particularly suited to television/multimedia systems that employ terrestrial cables as a means to distribute signals to end-users or remote nodes, but can also be applied to wireless signal distribution systems.

DETAILED DESCRIPTION OF THE INVENTION

Figure 1:
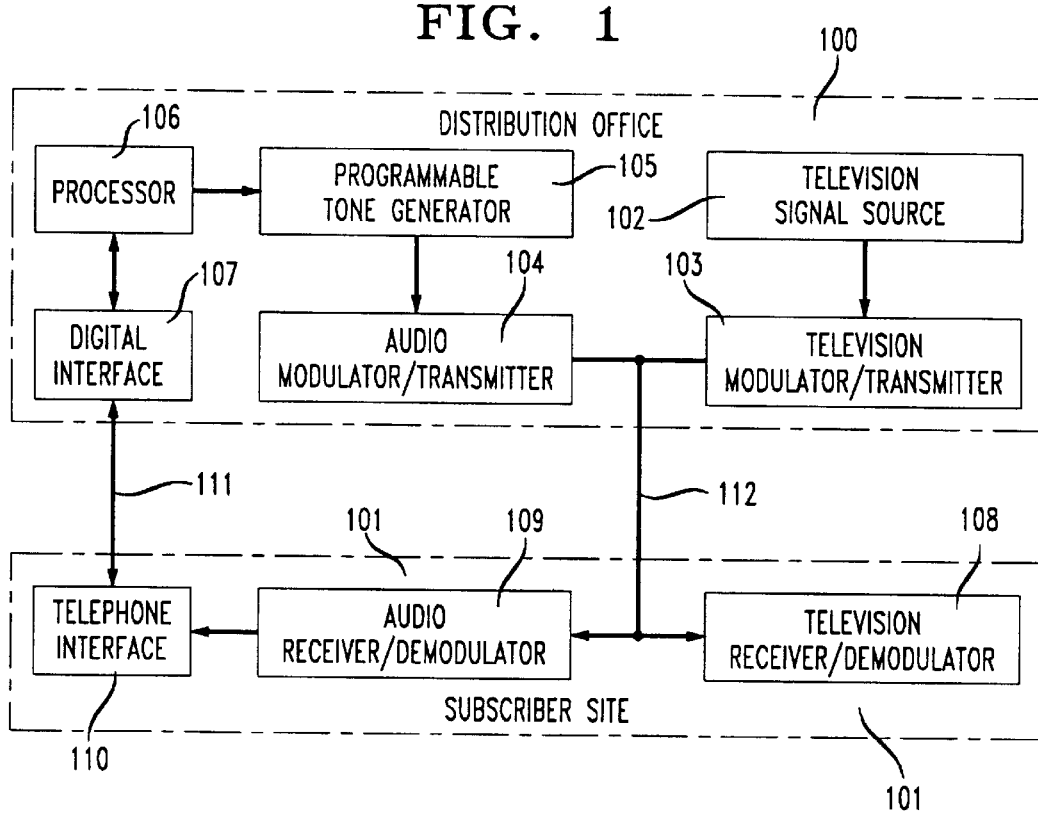
FIG. 1 is a simplified block diagram showing an exemplary embodiment of the invention.

FIG. 1 is a simplified block diagram showing a CATV distribution arrangement that includes an embodiment of the invention. The system comprises distribution office 100 and subscriber site 101. As shown, distribution office 100 includes television signal source 102, television modulator/transmitter 103, audio modulator/transmitter 104, programmable tone generator 105, processor 106, and digital interface 107. Subscriber site 101 includes television receiver/demodulator 108, audio receiver/demodulator 109, and telephone interface 110. Telephone line 111 is shown to connect digital interface 107 and telephone interface 110, and CATV line 112 links the transmitter/modulators (103, 104) with receiver/demodulators (108, 109). Telephone line 111 provides a standard bi-directional audio connection (the type commonly provided by public telephone networks), and although no telephone switching facilities are explicitly shown, it will be understood that line 111 is a standard switched telephone connection, not a line. CATV line 112 provides a broadband, omnidirectional connection from distribution office 100 to subscriber site 101 (the standard type of service connection provided to CATV subscribers). Television signal source 102, television modulator/transmitter 103, television receiver/demodulator 108, and line 112 are standard elements to any normal CATV service. No modification of these components is required to facilitate the practice of the invention, and it is assumed that between television modulator/transmitter 103 and television receiver/demodulator 108 there is a continuous transmission via line 112 of a broadband signal comprising a plurality of television channels (each of which carries audio and video information).

To initiate an integrity test of line 112, processor 106 instructs programmable tone generator 105 to produce an encoded audio test signal. Ideally this audio test signal should represent a specific bit pattern defined by processor 106. The actual generation of the audio test signal may be accomplished via a signal synthesizer, retrieval from digital memory, or a via one or more pre-recorded audio tapes within programmable tone generator 105. Processor 106 can be a general-purpose digital processor, such as a personal computer. The encoded audio test signal produced by programmable tone generator 105 is fed to audio modulator/transmitter 104, where, it is modulated to a frequency suitable for transmission along line 112. In this particular example, the audio test signal is modulated to a frequency band associated with a CATV channel that can be received by television receiver/demodulator 108, but which is not currently being utilized for the transmission of television program material. For example, if the CATV system of FIG. 1 is capable of transmitting and receiving 100 television channels, and only 99 of the channels actually carry television programming, the audio test signal produced by programmable tone generator 105 would be modulated to the frequency band of the one unused television channel by audio modulator/transmitter 104. This modulated audio test signal is then transmitted on line 112 to subscriber site 101 (along with the 99 television signals carried by the system of FIG. 1). As the modulated audio test signal is on an unused channel, its transmission has no effect upon the television signals being received at subscriber site 101. The modulated audio test signal is received and demodulated by audio receiver/demodulator 109, which is adapted to receive the particular channel on which the audio test signal was transmitted. The demodulated audio test signal is fed to telephone interface 110. Note that the television receiver/demodulator (108), which facilitates the reception of the standard television signals being transmitted via line 112 at subscriber site 101, is not utilized to receive the modulated audio test signal.

After the transmission of the modulated audio test signal along line 112 has been initiated, processor 106 transmits a control signal to digital interface 107. In response to this control signal digital interface 107 establishes a bi-directional voiceband telephone connection (111) to telephone interface 110 at subscriber site 101. Digital interfaces adapted to establish telephone connections in response to signals from digital processors are well-known (one example being a computer modem). Telephone interface 110 is a device linked to a standard telephone jack at subscriber site 101 that "answers" incoming calls to the telephone number associated with that particular jack. Automatic telephone answering circuits are well-known, and commonly found in commercially-available telephone answering machines, as well as many automated interfaces that facilitate telephone connections with computers from remote sites.

Telephone interface 110 relays the received demodulated audio test signal to digital interface 107 via bidirectional voiceband telephone connection 111. Upon receiving this audio test signal, digital interface 107 extracts the specific bit pattern represented by the signal. This extracted bit pattern information is transmitted from digital interface 107 to processor 106, where it is compared with the bit pattern that programmable tone generator 105 had previously been instructed to produce. If the two bit patterns match, it can be inferred that line 112 is providing a reliable link between distribution office 100 and subscriber site 101. If, however, bit errors are detected when the two patterns are compared, line 112 will be assumed to be a less than ideal transmission route. The amount of bit errors found in the pattern extracted from the audio test signal received at digital interface 107 can provide an indication of the severity of transmission problems being experienced along line 112.

The utilization of processor 106 to control programmable tone generator 105 allows for the particular "digital" audio test signal generated for use in testing line 112 to be adapted so that specific transmission problems can be detected and analyzed. For example, if a continuity test of line 112 is all that is desired, processor 106 can instruct programmable tone generator 105 to produce a simple repetitive bit pattern or constant tone, which, when detected at digital interface 107, would provide evidence that line 112 was intact. If more detailed testing of line 112 is desired, such as test of the line's frequency response, is desired, processor 106 can instruct programmable tone generator 105 to generate a series of signals covering a wide band of frequencies and/or bit rates. These signals would be received by telephone interface 110, transmitted to digital interface 107 and analyzed by processor 106 to determine the performance of line 112.

Figure 2:
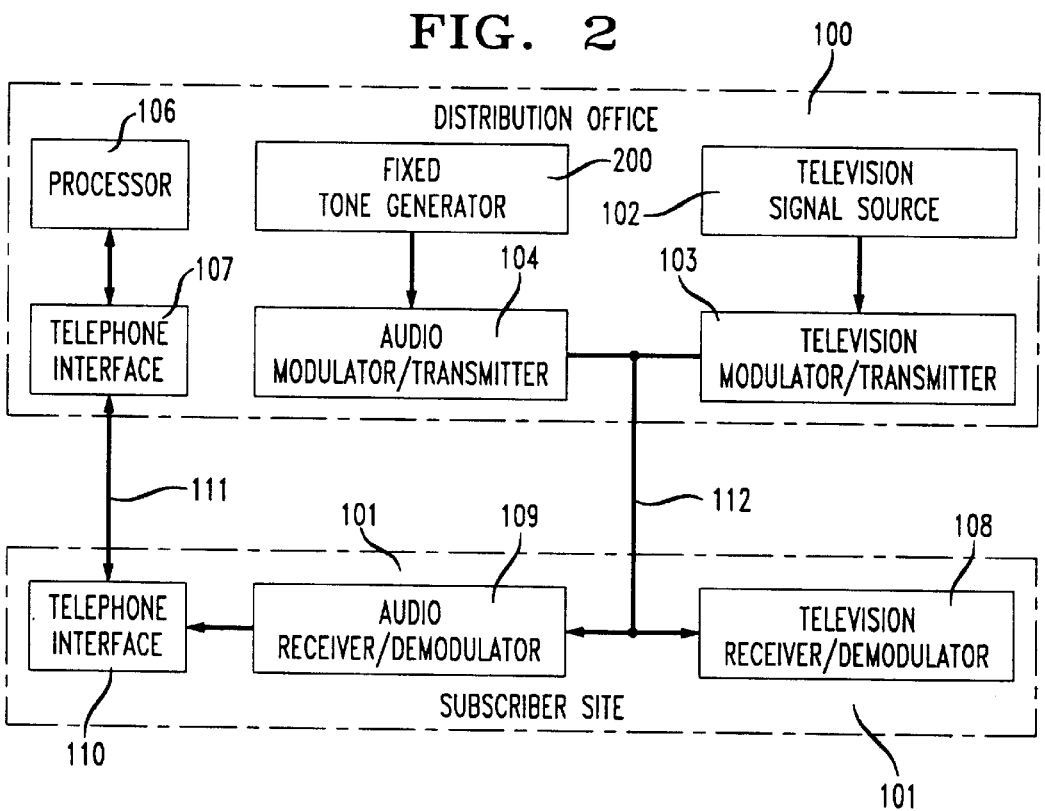
FIG. 2 is a simplified block diagram showing an alternate exemplary embodiment of the invention.

An alternate embodiment of the invention is shown in FIG. 2. All of the components are identical to the like-numbered components of the system shown in FIG. 1. However, the tone generator utilized in the system of FIG. 2 is a fixed tone generator (200). As shown, the system of FIG. 2 does not provide for a connection between processor 106 and this tone generator. Fixed tone generator 200 produces a continuous tone that is fed to audio modulator/transmitter 104, where it is modulated to a frequency suitable for transmission along line 112. This modulated signal is continually transmitted to subscriber site 101 via line 112, where it is demodulated by audio receiver/demodulator 109 and passed to telephone interface 110.

At any time, processor 106 can transmit a control signal to digital interface 107, and establish a bi-directional voiceband telephone connection (111) to telephone interface 110 at subscriber site 101. Telephone interface 110 relays the received demodulated audio test signal to digital interface 107 via bi-directional voiceband telephone connection 111. Upon receiving this audio test signal, digital interface 107 extracts the specific bit pattern represented by the signal. This extracted bit pattern information is transmitted from digital interface 107 to processor 106, where it is compared with the bit pattern that fixed tone generator 200 is known to produce. If the two bit patterns match, it can be inferred that line 112 is providing a reliable link between distribution office 100 and subscriber site 101. Naturally, the system of FIG. 2 could be adapted so that processor 106 established a connection to a given subscriber site on a periodic basis. In addition, the system could also be modified so that fixed tone generator only produced an audio test signal at certain predetermined times, and processor 106 established a connection to a given subscriber site at those same predetermined times.

Figure 3:
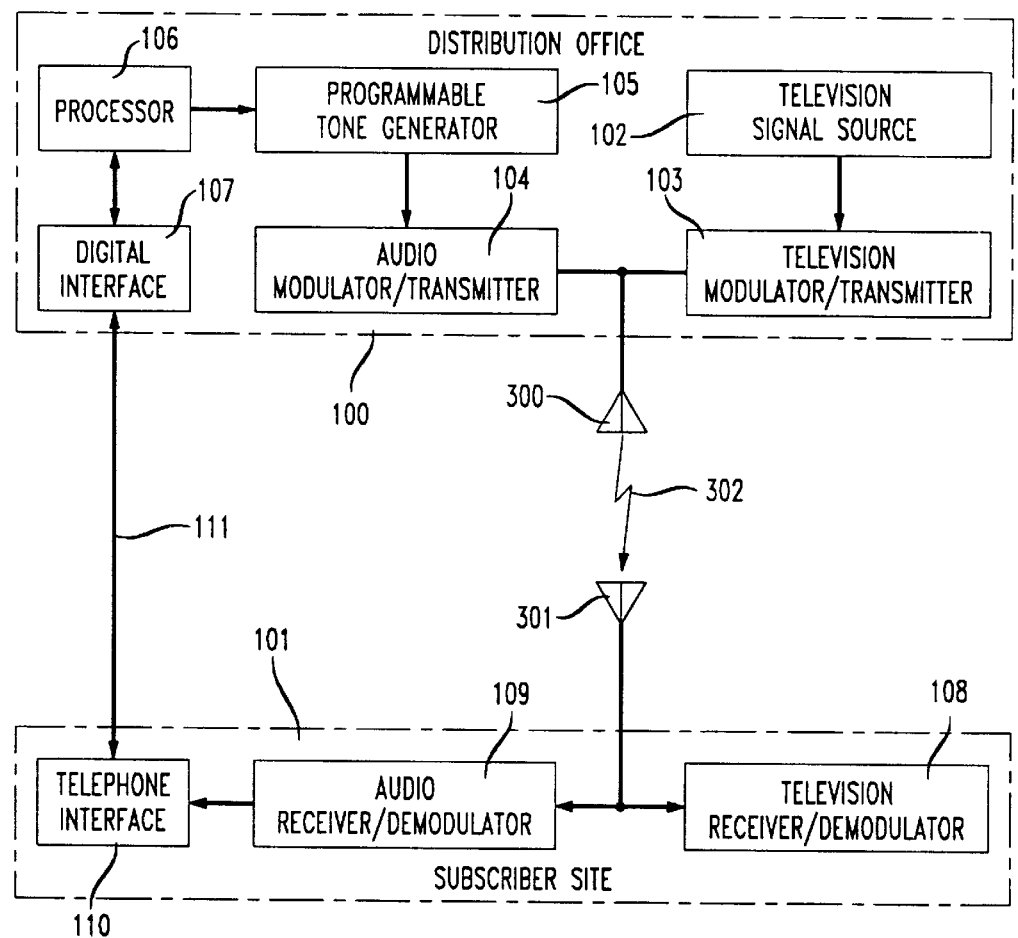
FIG. 3 is a simplified block diagram showing an embodiment of the invention applied in a wireless broadcasting environment.

Yet another embodiment of the invention is shown in FIG. 3. All of the components within the distribution office (100) and the customer site (101) are identical to those shown in FIG. 1. However, as shown, the modulated output of audio modulator/transmitter 104 and television modulator/transmitter 103 are routed to transmission antenna 300. The signals are transmitted in a wireless fashion to receiving antenna 301, and then routed to audio receiver/demodulator 109 and television receiver/demodulator 108. All signals are generated, modulated, demodulated and compared in a manner that is identical to that described for the system of FIG. 1. The only difference being that bit errors found in the pattern extracted from the audio test signal received at digital interface 107 will provide an indication of transmission problems being experienced along the wireless link (302) between antennas 300 and 301. This same wireless transmission arrangement could also be utilized with the system illustrated in FIG. 2.

It will be understood that the particular systems and methods described above are only illustrative of the principles of the present invention, and that various modifications could be made by those skilled in the art without departing from the scope and spirit of the present invention. One modification would include employing the invention to monitor transmissions being sent via an optical link or a microwave link. Another modification would utilize several transmission channels over which a modulated audio test signal could be sent to a subscriber site. If these channels were distributed across the bandwidth of the particular transmission medium being tested, an indication of the transmission medium frequency characteristics could be obtained. Yet another embodiment of the invention would include a modification where the voiceband telephone connection between the subscriber site and the distribution office is initiated from the subscriber site in response to the reception of the demodulated audio test signal at the subscriber site telephone interface. This would be facilitated by an automated dialing circuit contained within the subscriber site telephone interface. In any of the above described embodiments, it will also be understood that function of the audio receiver/demodulator could be performed by a simple frequency-modulated radio receiver, tuned to the same frequency band that the audio test signal transmitted from the distribution office had been modulated to.

Any of the above embodiments could also be adapted to employ a caller identification system that would recognize an incoming call intended for the telephone interface at the subscriber site as having originated at the distribution office. Once the incoming call was so recognized, the signal that causes standard telephones to ring would be blocked. This would allow a connection to the telephone interface to be established, and line test performed, without causing the needless ringing of telephones that were connected to the same line as the telephone interface. Caller identification systems capable of selectively muting telephone ringing are well-known in the art. One example of such a system is the Prostar DCS manufactured by Samsung of Deerfield Beach, Fla.

We claim:

1. A system for testing the transmission qualities of a signal transmission medium, comprising:

means for transmitting a test signal to a remote location via a first transmission medium;

means, located at said remote location, adapted to receive said test signal transmitted over said first transmission medium, and responsively generate an audio signal; and means for establishing a voiceband telephone connection to said remote location via a second transmission medium to thereby monitor said generated audio signal.

2. A system for testing transmission qualities within a multimedia signal transmission system, comprising:

means adapted to transmit a modulated audio test signal to a remote location via a transmission medium;

means, located at said remote location, adapted to receive and demodulate said modulated audio test signal transmitted over said transmission medium;

means for establishing a voiceband telephone connection to said remote location, and for thereby acquiring a generated audio signal; and means for analyzing said acquired audio signal, and thereby determining at least one transmission quality of said transmission medium.

3. The system of claim 2 wherein said means adapted to transmit a modulated audio test signal is responsive to commands generated by a digital processor.

4. The system of claim 2 wherein said modulated audio test signal is periodically transmitted by said means adapted to transmit a modulated audio test signal.

5. The system of claim 2 wherein said signal transmitted by said means adapted to transmit a modulated audio test signal is concurrently transmitted via said transmission medium with at least one modulated multimedia signal.

6. The system of claim 2 wherein said signal transmitted by said means adapted to transmit a modulated audio test signal represents a specific digital bit pattern.

7. The system of claim 2 wherein said means for analyzing said acquired audio signal comprises a digital processor.

8. A system for testing transmission qualities within a multimedia signal transmission system, comprising:

means adapted to periodically transmit a modulated audio test signal to a remote location via a transmission medium;

means, located at said remote location, adapted to receive and demodulate said modulated audio test signal transmitted over said transmission medium;

means, synchronized to the periodic transmission of said modulated audio test signal, for establishing a voiceband telephone connection to said remote location, and for thereby acquiring said demodulated audio test signal; and digital processing means adapted to analyze said acquired demodulated audio test signal, and thereby determine at least one transmission quality of said transmission medium.

9. The system of claim 8 wherein said signal transmitted by said means adapted to transmit a modulated audio test signal represents a specific digital bit pattern.

10. The system of claim 8 wherein said audio test signal transmitted by said means adapted to transmit a modulated audio test signal is concurrently transmitted via said transmission medium with at least one modulated multimedia signal.

11. A system for testing transmission qualities within a multimedia signal transmission system, comprising:

a digital processor;

a test signal generator adapted to produce, in response to one or more commands from said digital processor, at least one specific audio test signal;

an audio modulator adapted to modulate said specific audio test signal to a specific transmission frequency, and transmit said modulated signal to a remote location via a transmission medium;

means, located at said remote location, adapted to receive and demodulate said modulated audio test signal transmitted over said transmission medium;

means, responsive to said digital processor, adapted to establish a voiceband telephone connection to said remote location, and thereby acquire said demodulated audio test signal; and digital processing means adapted to analyze said acquired demodulated audio test signal, and thereby determine at least one transmission quality of said transmission medium.

12. The system of claim 11 wherein said signal transmitted by said audio modulator adapted to transmit a modulated audio test signal represents a specific digital bit pattern.

13. The system of claim 11 wherein said audio test signal transmitted by said audio modulator is concurrently transmitted via said transmission medium with at least one modulated multimedia signal.

14. A method for testing the transmission qualities of a signal transmission medium, comprising the steps of:

transmitting a test signal to a remote location via a first transmission medium;

receiving said transmitted test signal at said remote location, and responsively generating an audio signal; and establishing a voiceband telephone connection to said remote location via a second transmission medium to monitor said generated audio signal.

15. A method for testing transmission qualities within a multimedia signal transmission system, comprising the steps of:

transmitting a modulated audio test signal to a remote location via a transmission medium;

receiving and demodulating said modulated audio test signal at said remote location;

establishing a voiceband telephone connection to said remote location, and thereby acquiring generated audio signal; and analyzing said acquired audio signal to determine at least one transmission quality of said transmission medium.

16. The method of claim 15 further comprising the step of initiating the transmission of said modulated audio test signal via said transmission medium in response to one or more commands generated by a digital processor.

17. The method of claim 15 wherein the step of transmitting said modulated audio test signal via said transmission medium is performed periodically.

18. The method of claim 15 wherein said modulated audio test signal is concurrently transmitted via said transmission medium with at least one modulated multimedia signal.

19. The method of claim 15 wherein said transmitted modulated audio test signal represents a specific digital bit pattern.

20. The method of claim 15 wherein said analysis of said acquired audio signal comprises digital processing.

21. A method for testing transmission qualities within a multimedia signal transmission system, comprising the steps of:

periodically transmitting a modulated audio test signal to a remote location via a transmission medium;

receiving and demodulating said modulated audio signal at said remote location;

establishing a voiceband telephone connection to said remote location, concurrently with said periodic transmission of said modulated audio test signal, and thereby acquiring said demodulated audio test signal; and digitally analyzing said acquired demodulated audio test signal to determine at least one transmission quality of said transmission medium.

22. The method of claim 21 wherein said modulated audio test signal represents a specific digital bit pattern.

23. The method of claim 21 wherein said modulated audio test signal is concurrently transmitted via said transmission medium with at least one modulated multimedia signal.

24. A method for testing transmission qualities within a multimedia signal transmission system, comprising the steps of:

producing at least one specific audio test signal in response to one or more commands from a digital processor;

modulating said specific audio test signal to a specific transmission frequency;

transmitting said modulated signal to a remote location via a transmission medium;

receiving and demodulating said transmitted modulated audio test signal;

establishing, in response to one or more commands from said digital processor, a voiceband telephone connection to said remote location, and thereby acquiring said demodulated audio test signal; and digitally analyzing said acquired demodulated audio test signal to determine at least one transmission quality of said transmission medium.

25. The method of claim 24 wherein said modulated audio test signal represents a specific digital bit pattern.

26. The method of claim 24 wherein said modulated audio test signal is concurrently transmitted via said transmission medium with at least one modulated multimedia signal.

27. A system for testing the transmission qualities of a signal transmission medium, comprising:

means adapted to transmit a modulated audio test signal to a remote location via a transmission medium;

means for establishing a voiceband telephone connection to said remote location to thereby monitor an audio signal generated at said remote location in response to the reception of said modulated audio test signal; and means for analyzing an acquired audio signal, and thereby determining at least one transmission quality of said transmission medium.

28. The system of claim 27 wherein said means adapted to transmit a modulated audio test signal is responsive to commands generated by a digital processor.

29. The system of claim 27 wherein said modulated audio test signal is periodically transmitted by said means adapted to transmit a test signal.

30. The system of claim 27 wherein said signal transmitted by said means adapted to transmit a modulated audio test signal is concurrently transmitted via said transmission medium with at least one modulated multimedia signal.

31. The system of claim 27 wherein said signal transmitted by said means adapted to transmit a modulated audio test signal represents a specific digital bit pattern.

32. A method for testing transmission qualities within a multimedia signal transmission system, comprising the steps of:

transmitting a modulated audio test signal to a remote location via a transmission medium;

receiving and demodulating said modulated audio test signal at said remote location;

establishing a voiceband telephone connection to said remote location to thereby monitor an audio signal generated at said remote location in response to the reception of said modulated audio test signal; and analyzing an acquired audio signal, and thereby determining at least one transmission quality of said transmission medium.

33. The method of claim 32 further comprising the step of initiating the transmission of said modulated audio test signal via said transmission medium in response to one or more commands generated by a digital processor.

34. The method of claim 32 wherein the step of transmitting said modulated audio test signal via said transmission medium is performed periodically.

35. The method of claim 32 wherein said modulated audio test signal is concurrently transmitted via said transmission medium with at least one modulated multimedia signal.

36. The method of claim 32 wherein said transmitted modulated audio test signal represents a specific digital bit pattern.

37. The method of claim 32 wherein said analysis of said acquired audio signal comprises digital processing.

* * * * *